US011830235B2

(12) United States Patent
Liu et al.

(10) Patent No.: US 11,830,235 B2
(45) Date of Patent: Nov. 28, 2023

(54) IMAGE OPTIMIZATION METHOD AND SYSTEM BASED ON ARTIFICIAL INTELLIGENCE

(71) Applicant: Samsung Electronics Co., Ltd., Gyeonggi-do (KR)

(72) Inventors: Meidan Liu, Jiangsu (CN); Leyi Qiao, Jiangsu (CN); Po Hu, Jiangsu (CN)

(73) Assignee: Samsung Electronics Co., Ltd

(*) Notice: Subject to any disclaimer, the term of this patent is extended or adjusted under 35 U.S.C. 154(b) by 99 days.

(21) Appl. No.: 17/421,169

(22) PCT Filed: Jan. 9, 2020

(86) PCT No.: PCT/KR2020/000403
§ 371 (c)(1),
(2) Date: Jul. 7, 2021

(87) PCT Pub. No.: WO2020/145691
PCT Pub. Date: Jul. 16, 2020

(65) Prior Publication Data
US 2022/0122344 A1 Apr. 21, 2022

(30) Foreign Application Priority Data
Jan. 9, 2019 (CN) .......................... 201910018460.X

(51) Int. Cl.
*G06V 10/75* (2022.01)
*G06V 10/77* (2022.01)
(Continued)

(52) U.S. Cl.
CPC .............. *G06V 10/751* (2022.01); *G06T 5/50* (2013.01); *G06V 10/7715* (2022.01);
(Continued)

(58) Field of Classification Search
CPC .. G06V 10/751; G06V 10/7715; G06V 10/82; G06T 5/50; G06T 2207/20081;
(Continued)

(56) References Cited

U.S. PATENT DOCUMENTS

2003/0058939 A1* 3/2003 Lee .................. H04N 7/147
375/E7.076
2004/0034611 A1 2/2004 Kee et al.
(Continued)

FOREIGN PATENT DOCUMENTS

| CN | 102819726 | 12/2012 |
| CN | 103093447 | 5/2013 |

(Continued)

OTHER PUBLICATIONS

PCT/ISA/210 Search Report issued on PCT/KR2020/000403, dated May 4, 2020, pp. 3.
(Continued)

*Primary Examiner* — Xuemei G Chen
(74) *Attorney, Agent, or Firm* — The Farrell Law Firm, P.C.

(57) ABSTRACT

The present application discloses an image optimization method and system based on artificial intelligence, comprising: performing image object recognition for a template image, and extracting and recording template information of the template image; identifying the number and categories of primary objects in a to-be-optimized image by using an image recognition algorithm of a neural network; performing matching in a template database for the to-be-optimized image according to a set matching condition and the recorded template information to obtain optimal template information; scaling the primary object in the to-be-optimized image according to layout information in the optimal template information; cropping and adjusting a background
(Continued)

part of the to-be-optimized image according to resolution requirements of an output target image and a basic composition principle; combining an image of the processed primary object with a background image according to the layout information in the optimal template information to restore to a complete image; if an original to-be-optimized image is partly missing after being processed, patching an image of a missing part is patched according to an image completion algorithm. By the technical solution of the present application, the composition and spatial relationship of the image can be optimized.

10 Claims, 2 Drawing Sheets

(51) Int. Cl.
*G06V 10/82* (2022.01)
*G06T 5/50* (2006.01)
(52) U.S. Cl.
CPC .... *G06V 10/82* (2022.01); *G06T 2207/20081* (2013.01); *G06T 2207/20084* (2013.01)
(58) Field of Classification Search
CPC .......... G06T 2207/20084; G06T 11/00; G06N 3/0454; G06N 3/08
See application file for complete search history.

(56) References Cited

U.S. PATENT DOCUMENTS

| | | | |
|---|---|---|---|
| 2006/0204137 A1* | 9/2006 | Shimoda | G06T 11/60 345/660 |
| 2007/0147700 A1 | 6/2007 | Jeong et al. | |
| 2009/0208062 A1* | 8/2009 | Sorek | H04N 5/23229 382/313 |
| 2010/0079609 A1* | 4/2010 | Hwang | G06T 3/4053 348/222.1 |
| 2010/0245610 A1* | 9/2010 | Ahn | H04N 5/23218 348/222.1 |
| 2011/0026835 A1* | 2/2011 | Ptucha | G06V 10/751 382/209 |
| 2011/0164109 A1* | 7/2011 | Baldridge | H04N 13/266 348/43 |
| 2013/0064465 A1* | 3/2013 | Tin | G06T 7/11 382/248 |
| 2016/0063735 A1* | 3/2016 | Furuya | G06T 7/90 382/284 |
| 2016/0078598 A1* | 3/2016 | Tanabe | H04N 5/272 382/284 |
| 2016/0155009 A1* | 6/2016 | Han | H04N 5/23222 382/173 |
| 2017/0085834 A1* | 3/2017 | Kim | H04N 7/141 |
| 2017/0236292 A1 | 8/2017 | Lin | |
| 2018/0144209 A1 | 5/2018 | Kim et al. | |
| 2019/0114804 A1* | 4/2019 | Sundaresan | G06V 30/194 |
| 2019/0172184 A1* | 6/2019 | Pan | G06T 7/277 |
| 2019/0251401 A1* | 8/2019 | Shechtman | G06V 30/19173 |
| 2019/0279346 A1* | 9/2019 | Zhang | G06T 5/50 |
| 2019/0295218 A1 | 9/2019 | Wang et al. | |
| 2020/0117912 A1* | 4/2020 | Thompson | G06T 7/70 |

FOREIGN PATENT DOCUMENTS

| | | |
|---|---|---|
| CN | 103248748 | 8/2013 |
| CN | 104392202 | 3/2015 |
| CN | 105488756 | 4/2016 |
| CN | 105608459 | 5/2016 |
| CN | 105763710 | 7/2016 |
| CN | 105869198 | 8/2016 |
| CN | 106803234 | 6/2017 |
| JP | 2004-140693 | 5/2004 |
| MX | 2017011141 | 1/2018 |
| WO | WO 2018/126396 | 7/2018 |

OTHER PUBLICATIONS

PCT/ISA/237 Written Opinion issued on PCT/KR2020/000403, dated May 4, 2020, pp. 6.

* cited by examiner

[Fig. 1]
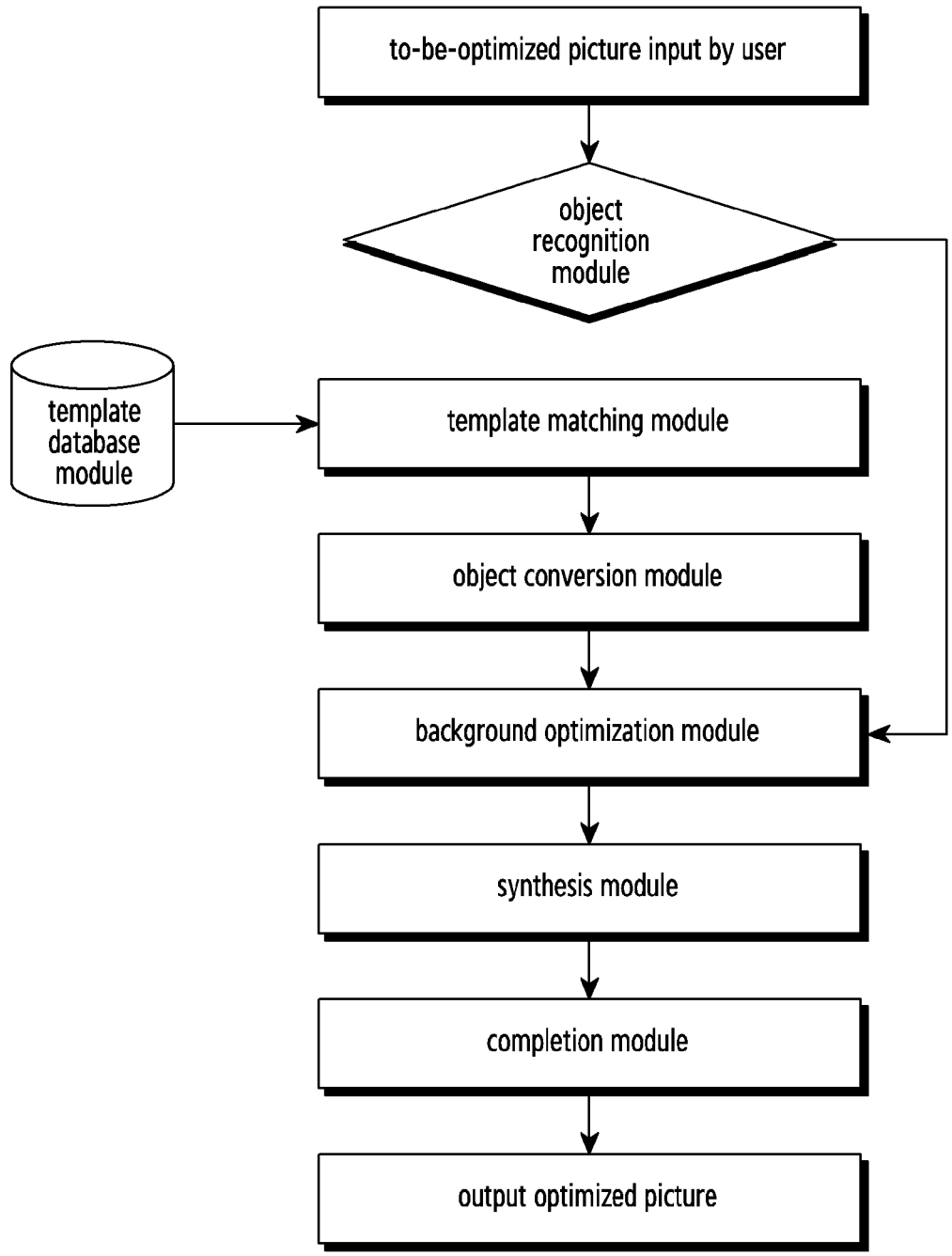

[Fig. 2]
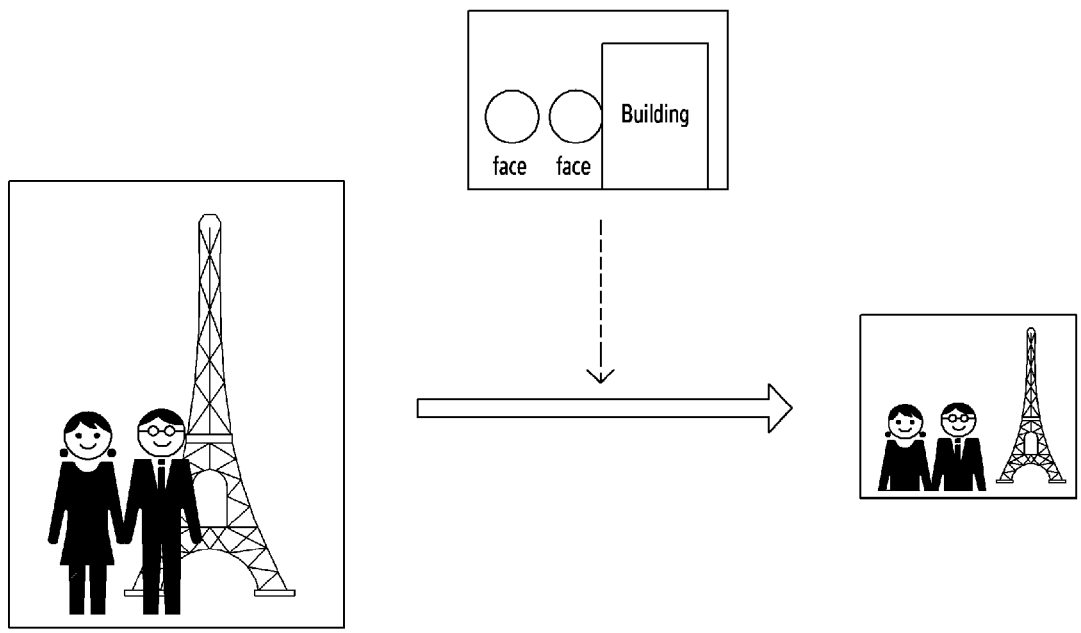
[Fig. 3]
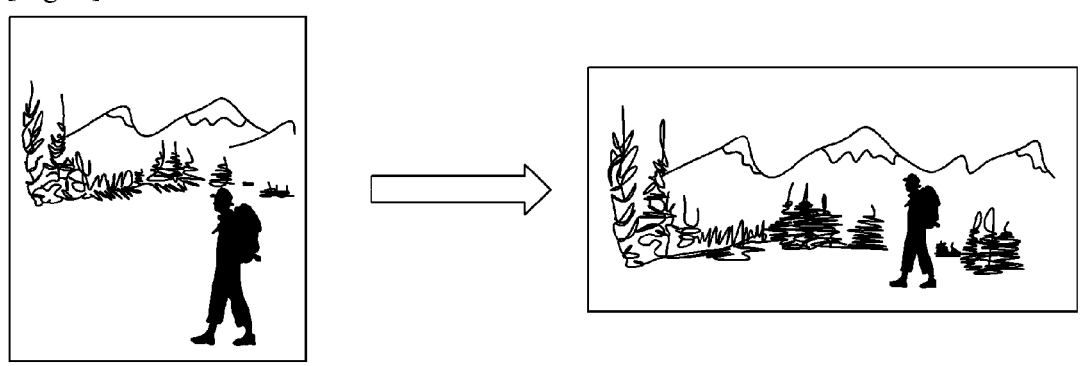

IMAGE OPTIMIZATION METHOD AND SYSTEM BASED ON ARTIFICIAL INTELLIGENCE

PRIORITY

This application is a National Phase Entry of International Application No. PCT/KR2020/000403, which was filed on Jan. 9, 2020, and claims priority to Chinese Patent Application No. 201910018460.X, which was filed on Jan. 9, 2019, the entire content of each of which is incorporated herein by reference.

BACKGROUND

1. Field

The present application relates to the field of image recognition and image pattern matching in artificial intelligence, and in particular to an image optimization method and system based on artificial intelligence.

2. Related Art

The current image processing either crops the size of an image or adjusts the brightness, contrast and depth of field of the image.

For an image with poor composition and spatial relationship, the details of composition cannot be accurately adjusted because existing image optimization techniques do not support the optimization of size and spatial relationships between image elements. Accordingly, the existing techniques cannot optimize the composition and spatial relationship of the image.

SUMMARY

The present application provides an image optimization method and system based on artificial intelligence, to optimize the composition and spatial relationship of an image.

The present application discloses an image optimization method based on artificial intelligence, comprising:

A. performing image object recognition for a template image, and extracting and recording template information of the template image;

B. identifying the number and categories of primary objects in a to-be-optimized image by using an image recognition algorithm of a neural network;

C. performing matching in a template database for the to-be-optimized image according to a set matching condition and the recorded template information to obtain optimal template information;

D. scaling the primary object in the to-be-optimized image according to layout information in the optimal template information;

E. cropping and adjusting a background part of the to-be-optimized image according to resolution requirements of an output target image and a basic composition principle; and F. combining an image of the processed primary object with a background image according to the layout information in the optimal template information to restore to a complete image.

Preferably, the method further comprises:

G. if an original to-be-optimized image is partly missing after being processed, patching an image of a missing part is patched according to an image completion algorithm.

Preferably, in the G, the patching the image of the missing part according to the image completion algorithm comprises: if redundancy of the image itself meets patching requirements, patching an unknown part by using information of a known part of the image; otherwise, learning high-level features in the image by using a convolutional neural network, and using the high-level features to guide generation of the missing part of the image.

Preferably, the A comprises: performing image object recognition on the template image to identify a primary object of the template image, and identifying a category of the primary object and layout information of the primary object;

the template information comprises any combination of following information: a resolution, an application scenario, the number of objects, an object category, layout information, and an aspect ratio of the image.

Preferably, the application scenario is obtained according to an application scenario that is calibrated by the template image, and at least comprises: an avatar, a background, a desktop, or a cover;

the object category is a category of the primary object, and at least comprises: a face, an animal, or a building;

the layout information of the primary object at least comprises: a spatial relationship between the primary objects, or size of an area occupied by the primary object in the image.

Preferably, in the F, the combining and restoring is performed according to image location information in the layout information.

The present application also discloses an image optimization system based on artificial intelligence, comprising: a template database module, an object recognition module, a template matching module, an object conversion module, a background optimization module and a synthesis module, wherein the template database module is configured to perform image object recognition for a template image, and extract and record template information of the template image;

the object recognition module is configured to identify the number and categories of primary objects in a to-be-optimized image by using an image recognition algorithm of a neural network;

the template matching module is configured to perform matching in a template database for the to-be-optimized image according to a set matching condition and the recorded template information to obtain optimal template information;

the object conversion module is configured to scale the primary object in the to-be-optimized image according to layout information in the optimal template information;

the background optimization module is configured to crop and adjust a background part of the to-be-optimized image according to resolution requirements of an output target image and a basic composition principle; and the synthesizing module is configured to combine an image of the primary object processed by the object conversion module with a background image processed by the background optimization module according to the layout information in the optimal template information to restore to a complete image.

Preferably, the system further comprises a completion module, wherein the completion module is configured to, if an original to-be-optimized image is partly missing after being processed, patch an image of a missing part according to an image completion algorithm.

Preferably, the completion module is specifically configured to, if redundancy of the image itself meets patching requirements, patch an unknown part by using information of a known part of the image; otherwise, learn high-level features in the image by using a convolutional neural network, and use the high-level features to guide generation of the missing part of the image.

Preferably, the template database module is specifically configured to: perform image object recognition on the template image to identify a primary object of the template image, and identify a category of the primary object and layout information of the primary object;

the template information comprises any combination of following information: a resolution, an application scenario, the number of objects, an object category, layout information, and an aspect ratio of the image.

Preferably, the application scenario is obtained according to an application scenario that is calibrated by the template image, and at least comprises: an avatar, a background, a desktop, or a cover;

the object category is a category of the primary object, and at least comprises: a face, an animal, or a building;

the layout information of the primary object at least comprises: a spatial relationship between the primary objects, or size of an area occupied by the primary object in the image.

Preferably, the synthesizing module is specifically configured to perform the combining and restoring according to image location information in the layout information.

As can be seen from the foregoing technical solutions, the image optimization method and system based on artificial intelligence that are provided by the present application can automatically optimize a to-be-optimized image uploaded by a user according to a current application scenario, to obtain a composition suitable for the current application scenario.

The present application may identify characters, animals, buildings and other features in an image by using a deep learning technology in the field of artificial intelligence, perform matching in a template database according to system requirements, user selection, image information (based on an output result of an image recognition module) and the like to obtain an optimal template, and extract, process and crop the image according to the optimal template to obtain one or more images meeting the requirements, thereby improving the quality and professionalism of images.

BRIEF DESCRIPTION OF DRAWINGS

FIG. 1 is a work flowchart of each module of an image optimization system based on artificial intelligence according to the present application.

FIG. 2 is a diagram of a user automatically optimizing an avatar scenario according to an embodiment of the present application.

FIG. 3 is a diagram of a user automatically optimizing a background image according to an embodiment of the present application.

DETAILED DESCRIPTION

In order to make the object, technical solution and merits of the present application clearer, the present application will be illustrated in detail hereinafter with reference to the accompanying drawings and embodiments.

The present application provides an image optimization technical solution based on artificial intelligence. The deep learning technology in the field of artificial intelligence may be used to perform image recognition and perform extraction and matching of patterns such as image composition and style. The deep learning technology may use a target image or a large number of professional images provided by a user as an input to extract, process and obtain the composition and style features of the target image, and may process an image by using the features as a template to obtain one or more optimized images.

FIG. 1 shows modules of the present application. The present application may include a template database module, an object recognition module, a template matching module, an object conversion module, a background optimization module and a synthesis module, and may further include a completion module. Each module is described as follows.

1) The template database module is configured to perform image object recognition for a template image to identify a primary object, identify a category and layout information of the primary object, and extract and record template information of the template image. The template information includes any combination of the following information: resolution, an application scenario, the number of objects, an object category, layout information and an aspect ratio of the image.

The application scenario is obtained according to an application scenario calibrated by the template image, and includes, but is not limited to, an avatar, a background, a desktop, a cover, and the like.

The object category is a category of the primary object, including: face, animal, building, etc.

The layout information of the primary object may be a spatial relationship between primary objects, or the size of an area occupied by the primary object in the image.

The template image may be some images with higher quality.

For example, assume an image database contains a template image of 320*320, which is calibrated for an avatar scenario of a user. After being identified by the template database module of the present application, it is confirmed that the template image contains one face and one animal. After being processed by the template database module, the obtained template information is: resolution 320*320/applicable to the avatar scenario/primary object including face+animal/the face occupying 80% of the left half of the image/the animal occupying 50% of the right half of the image. The above template information is recorded according to a preset format as follows:

{resolution: xxx*xxx;
application scenario: XXX;
the number of objects: ?;
object category: AAA/BBB/CCC . . . ;
layout information: AAA: {size/location}, BBB: {size/location}, CCC: {size/location}, . . . ;
other information}.

Through identifying and analyzing a large number of template images, template information of a large number of template images may be obtained, thereby obtaining templates for different resolutions, specific application scenarios, and different combinations of primary object categories. The "different combinations of primary object categories" include a combination of people and animals, a combination of people and buildings, a combination of animals and buildings, and the like.

2) The object recognition module is configured to identify the number and categories of primary objects in a to-be-optimized image input by a user by using the to-be-optimized image as a source and using an image recognition algorithm of a neural network.

3) The template matching module is configured to perform matching in the template database for the to-be-optimized image according to a set matching condition and the template information in the template database to obtain optimal template information.

For example, the matching condition may be a resolution, a primary object category, the number of primary objects, an application scenario, etc. The template information is selected according to the set matching condition, and different matching conditions may be given different weights to score each piece of template information. Finally, the template information with the highest score is determined as the optimal template information.

4) The object conversion module is configured to scale the primary object in the to-be-optimized image according to the layout information in the optimal template information. Specifically, the size of the primary object in the to-be-optimized image is scaled according to the size of the primary object in the optimal template information.

Further, the overall or local brightness of the image, the angle of the primary object, and the like may also be adjusted.

5) The background optimization module is configured to crop and adjust the background part of the to-be-optimized image according to the resolution requirements of an output target image and a basic composition principle (for example, the principle of trichotomy, golden ratio, etc.).

6) The synthesis module is configured to, according to the layout information in the optimal template information, combine the image of the primary object processed by the object conversion module with the background image processed by the background optimization module to restore to a complete image. Specifically, the combining and restoring is performed according to image location information in the layout information.

7) The completion module is configured to, if an original image is partly missing after being adjusted by the above modules of the present application, for example, background missing, building missing, etc., patch the missing part according to an image completion algorithm. Herein, any image completion algorithm can be used to patch the missing part. Preferably, if the redundancy of the image itself can meet the patching requirements, an unknown part is patched by using the information of a known part of the image; otherwise, a convolutional neural network is used to learn high-level features in the image, and these characteristics (features) are utilized to guide the generation of the missing part of the image.

When there is more than one optimal matching template in the template database, the to-be-optimized image may be processed according to a plurality of optimal matching template information in the above manner, and finally a plurality of optimized images is provided to the user for selection.

It can be seen from the foregoing description that the present application may identify characters, animals, buildings and other features in an image by using a deep learning technology in the field of artificial intelligence, perform matching in a template database according to system requirements, user selection, image information (based on an output result of an image recognition module) and the like to obtain an optimal template, and extract, process and crop the image according to the optimal template to obtain one or more images meeting the requirements, thereby improving the quality and professionalism of images.

The present application may be used separately as a stand-alone application or as a middleware for other applications. When the technical solution of the present application is used separately as an application, a process is as follows:

a: a system requires the user to provide an image meeting certain requirements;

b: the user uploads an original image (i.e., the to-be-optimized image as described above);

c: the system automatically optimizes the image uploaded by the user according to the optimal matching template in the template database to ensure to meet the system requirements, and beautifies the current application scenario.

The technical solution of the present application is illustrated by two specific embodiments.

Referring to FIG. 2, in a scenario in which a user is required to upload an image as the user's avatar, it is generally required that the height and width of the avatar is relatively close, and the face is the primary object of the image. If the difference between the height and width of the image uploaded by the user is large and the face is relatively small, the depth of field of the face and background building may be changed by the solution of the present application, so that the proportion of the face is increased, and some graphic information such as buildings and scenery in the background are not damaged. Finally, the image is adjusted to have a suitable aspect ratio, so as to obtain a satisfied avatar image based on the original image provided by the user.

Referring to FIG. 3, based on a vertical image given by a user, if a horizontal background image is to be obtained, the number and categories of primary objects in the image are identified by using the solution of the present application, and a horizontal background template is obtained by performing matching in the template database. The original image is re-arranged, and a missing part is patched by the completion module to obtain a high-quality background image.

The foregoing is only preferred embodiments of the present application and is not used to limit the protection scope of the present application. Any modification, equivalent substitution and improvement without departing from the spirit and principle of the present application are within the protection scope of the present application.

The invention claimed is:

1. A method performed by a device for image optimization based on artificial intelligence (AI), the method comprising:

performing an image object recognition for a template image, and extracting first information of the template image;

recording the first information;

identifying a number and a category of a primary object in a first image by using an image recognition algorithm of a neural network;

performing a matching in a template database for the first image according to a set matching condition and the recorded first information to obtain second information;

scaling the primary object in the first image according to layout information in the second information;

cropping a background part of the first image according to resolution requirements of an output target image and a basic composition principle;

adjusting the background part of the first image; and combining an image of the scaled primary object with a background image according to layout information in the second information to restore to a complete image.

2. The method of claim 1, further comprising:

in case that an original first image is partly missing after being processed, patching an image of a missing part according to an image completion algorithm.

3. The method of claim 2, wherein patching the image of the missing part according to the image completion algorithm comprises:

in case that a redundancy of the image itself meets patching requirements, patching an unknown part by using information of a known part of the image; and in case that the redundancy of the image itself does not meet the patching requirements, learning high-level features in the image by using a convolutional neural network, and using the high-level features to guide generation of the missing part of the image.

4. The method of claim 2, wherein the partly missing comprises at least one background missing or building missing.

5. The method of claim 1, wherein performing image object recognition comprises:

performing the image object recognition on the template image to identify a primary object of the template image, and identifying a category of the primary object and layout information of the primary object; and wherein the first information comprises combination information of at least two of a resolution, an application scenario, the number of objects, an object category, layout information, or an aspect ratio of the image.

6. The method of claim 5, wherein the application scenario is obtained according to an application scenario that is calibrated by the template image, and comprises at least one of an avatar, a background, a desktop, or a cover.

7. The method of claim 5, wherein the object category is a category of the primary object, and comprises at least one of a face, an animal, or a building.

8. The method of claim 5, wherein the layout information of the primary object comprises at least one of a spatial relationship between the primary objects, or size of an area occupied by the primary object in the image.

9. The method of claim 1, wherein the layout information comprises image location information.

10. The method of claim 1, wherein the basic composition principle comprises at least one of a principle of trichotomy or golden ratio.

* * * * *